United States Patent
Kasper et al.

(10) Patent No.: US 6,916,164 B2
(45) Date of Patent: Jul. 12, 2005

(54) TIRE MOLD HAVING IMPROVED HEAT TRANSFER CHARACTERISTICS

(75) Inventors: Brett Alan Kasper, Stow, OH (US); James Stephen Horvath, Doylestown, OH (US); Todd Andrew Bachochin, Berlin Center, OH (US); Gregory Lee Loney, Cuyahoga Falls, OH (US); David Alton Balderson, Alliance, OH (US); Michael James Hogan, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 216 days.

(21) Appl. No.: 10/327,772

(22) Filed: Dec. 23, 2002

(65) Prior Publication Data

US 2004/0121033 A1 Jun. 24, 2004

(51) Int. Cl.[7] .............................................. B29C 35/02
(52) U.S. Cl. ....................................................... 425/46
(58) Field of Search ..................... 425/46, 47

(56) References Cited

U.S. PATENT DOCUMENTS 3,337,918 A * 8/1967 Pacciarini et al. ............ 425/39
3,520,024 A * 7/1970 Caretta et al. ................ 425/47
3,682,576 A * 8/1972 Gross ........................... 425/46
3,778,203 A * 12/1973 MacMillan ................... 425/47
3,779,677 A    12/1973 Greenwood
3,867,504 A     2/1975 Greenwood
3,868,203 A *  2/1975 Turk ............................ 425/46
4,568,259 A     2/1986 Mattson
4,741,683 A     5/1988 Hilke et al.
6,267,084 B1    7/2001 Louchart, III
6,413,068 B1    7/2002 Steidl et al.
6,716,013 B2 *  4/2004 Fike ............................. 425/46

FOREIGN PATENT DOCUMENTS

EP          0 250 708 B1     9/1992
WO          WO93/24309    * 12/1993

* cited by examiner

Primary Examiner—James P. Mackey
(74) Attorney, Agent, or Firm—Thompson Hine LLP

(57) ABSTRACT

A tire mold having improved heat transfer is disclosed. A plurality of wear plates are installed onto a conical inner surface of an actuating ring. The wear plates are designed to improve thermal transfer between the actuating ring and a segmented treadmolding ring, reducing tire cure time and temperature variation within the mold.

12 Claims, 6 Drawing Sheets

TIRE MOLD HAVING IMPROVED HEAT TRANSFER CHARACTERISTICS

FIELD

This invention relates to a tire mold. In particular, this invention relates to a tire mold utilizing wear plates to achieve improved heat transfer characteristics.

BACKGROUND OF THE INVENTION

Tire molds for producing pneumatic vehicle tires are typically constructed of steel or aluminum, and are heated by steam heated platens or by placing the molds in steam domes. Thermal conduction is usually relied upon to transfer heat to the tread and sidewall forming surfaces, though heat pipes may also be used. The mold typically includes upper and lower sidewall forming parts and a segmented treadmolding ring. The segments of the treadmolding ring are affixed to "sliding shoes" which are in turn attached to guide mechanisms on a conical inner surface of an actuating ring such that the treadmolding segments move radially inwardly when the actuating ring is lowered.

Sheets of lubricating "sliding material" are mounted on the actuating ring's conical inner surface to facilitate smooth movement of the treadmolding ring segments during opening and closing of the mold. The sliding material is typically formed into a thin sheet and consists of two layers. A base layer, usually made of steel, provides support and faces the conical inner surface of the actuating ring. A top lubricating layer, made of a bronze composition, is used to facilitate the movement of the treadmolding segment and faces the treadmolding ring segments.

The high forces exerted upon the treadmolding segments as they are moved by the actuating ring, combined with the repetitive action of the tire mold in a production environment, causes the relatively soft lubricating layer of the sliding material to quickly wear. In view of this problem, a plurality of individual "wear plates" have been used wherein segmented portions of the sliding material are disposed about the conical inner surface of the actuating ring. The wear plates may be periodically inspected and individually replaced as needed. Examples of prior tire molds are taught by Hilke et al. in U.S. Pat. No. 4,741,683 and Steidl et al. in U.S. Pat. No. 6,413,068.

It is desirable to maximize heat conduction to the tread and sidewall forming portions of a tire mold. If the thermal conduction properties of the mold are less than optimum, the cure time for the tires will increase due to the additional time required to restore the mold to the proper curing temperature following a tire loading or unloading cycle. This results in reduced production capacity for the mold. Inefficient thermal conduction can also cause difficulty in providing temperature uniformity within the mold. For example, the air gaps surrounding the wear plates of prior art molds have a lower thermal conductivity than the wear plates themselves. These air gaps can result in nonuniform thermal conductivity and impede the transfer of heat to the tread forming portions of the mold. A wear plate is needed that will provide better, more uniform thermal conductivity between the actuating ring and the segmented treadmolding ring in order to improve heat transfer to the treadmolding surfaces.

SUMMARY

The present invention provides the desired improvement in thermal conductivity between the actuating ring and the treadmolding ring of a tire mold. A plurality of wear plates are shaped to provide the desired sliding characteristics of the prior art, and additionally function as an improved heat transfer media. The wear plates minimize air gaps between the actuating ring and the treadmolding ring, resulting in improved and more uniform thermal transfer to the treadmolding surfaces.

DESCRIPTION OF THE PREFERRED EMBODIMENT(S)

Figure 1:
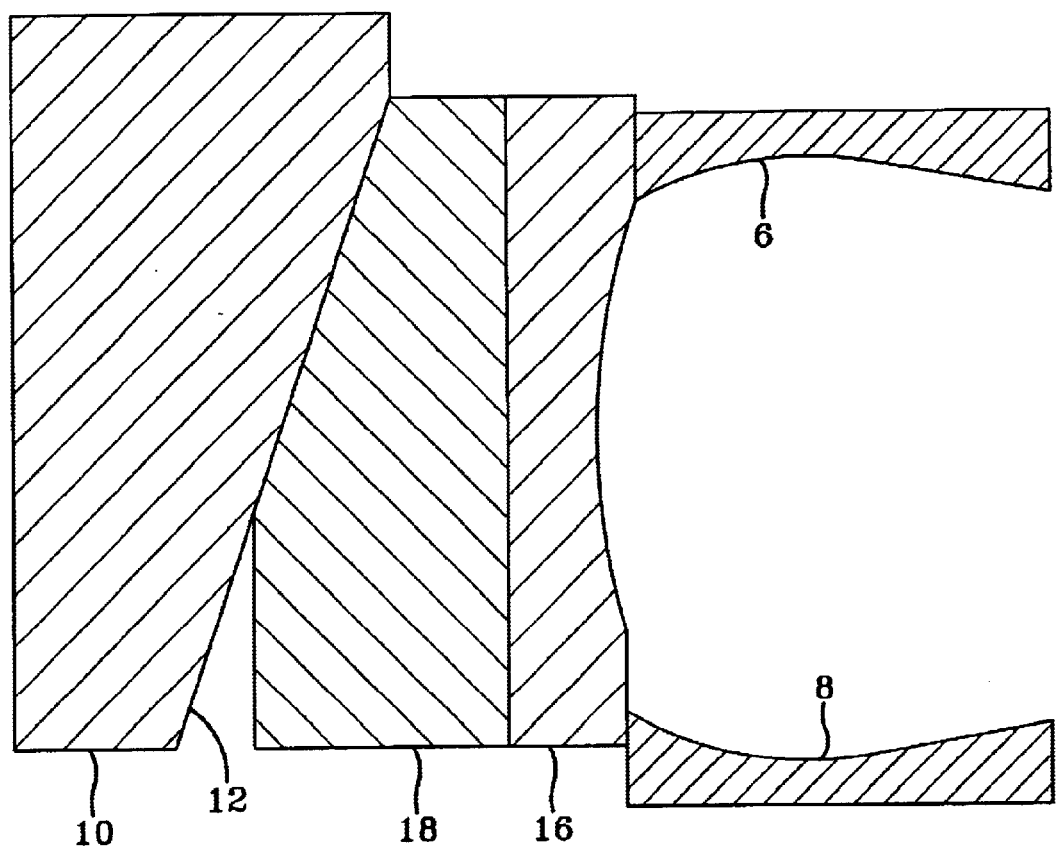
FIG. 1 illustrates a simplified cross-sectional schematic of the general arrangement of a segmented tire mold according to a preferred embodiment of the present invention.

A simplified schematic of the general arrangement of a tire mold according to a preferred embodiment of the present invention is shown in FIG. 1. Upper and lower sidewall forming parts 6,8 are used to mold the sidewalls of the tire. An actuating ring 10 encircles the upper and lower sidewall forming parts and includes a conical inner surface 12. The actuating ring is vertically adjustable such that the conical inner surface 12 slideably contacts a treadmolding segment 16. The treadmolding segment 16 may include a sliding shoe 18. The sliding shoe 18 may be a separate piece, or may be embodied as one piece with the treadmolding segment 16. As the actuating ring 10 is moved downwardly, the conical inner surface 12 exerts pressure on the treadmolding segment 16, causing the treadmolding segment 16 to move radially inwardly to couple with the upper and lower sidewall forming parts 6,8. A plurality of segments 16 join together at an inward position to form a treadmolding ring (not shown) to mold the tread of the tire.

Figure 2:
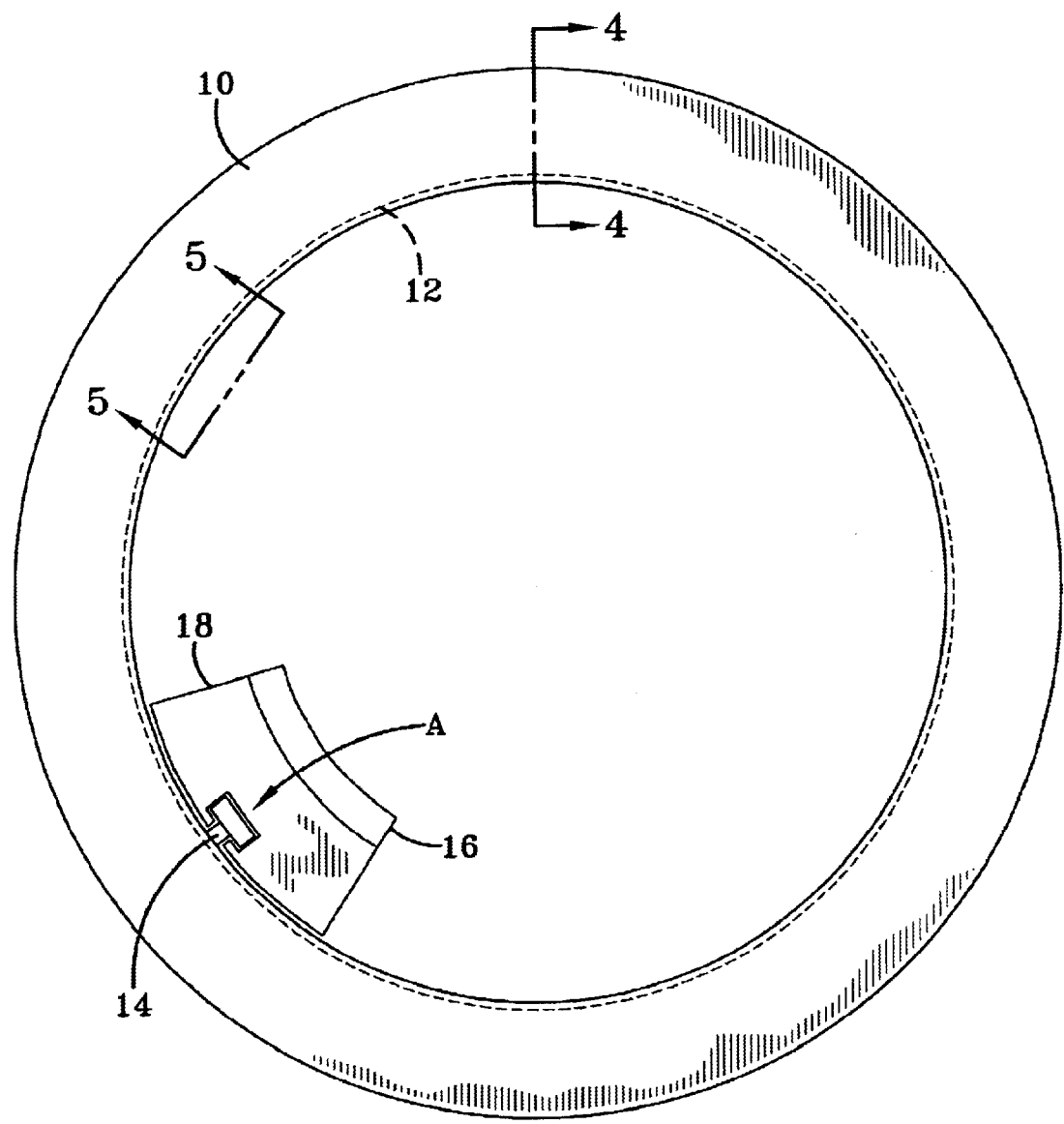
FIG. 2 is a top view of the actuating ring and an example treadmolding segment of the tire mold of FIG. 1 according to a preferred embodiment of the present invention.

A top view of the actuating ring 10 and an example treadmolding segment 16 with a sliding shoe 18 are shown in FIG. 2. A conical inner surface 12 of the actuating ring includes a plurality of guide mechanisms 14. A plurality of treadmolding segments 16 are movably affixed to the actuating ring by the guide mechanisms 14 to effect movement of the treadmolding segments 16. When the actuating ring 10 is lowered, the segments 16 move inwardly radially.

Figure 3:
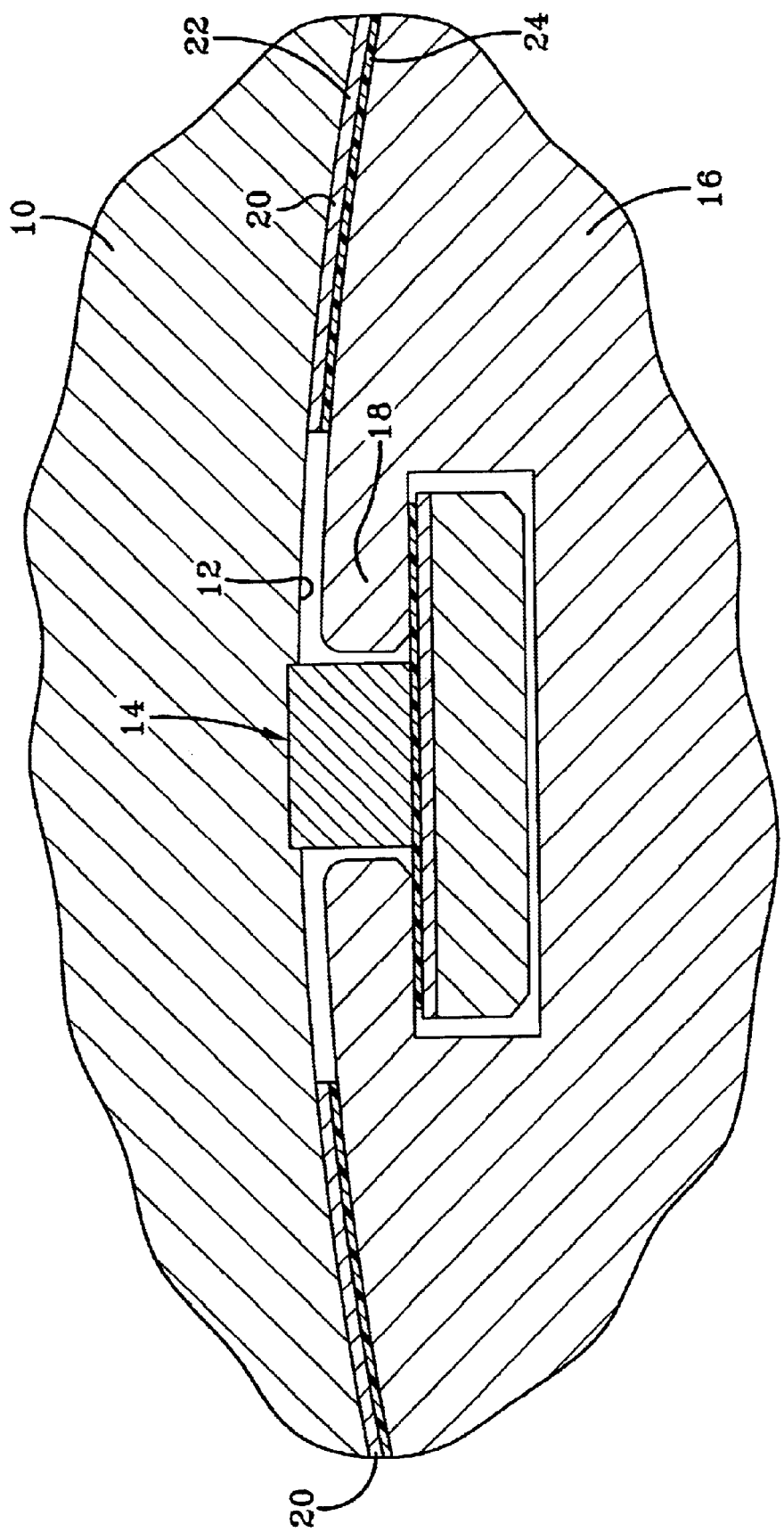
FIG. 3 is an enlarged view of Detail "A" in FIG. 2 showing the cooperation between the treadmolding segment and the actuating ring according to a preferred embodiment of the present invention.

FIG. 3 is an enlarged view showing detail "A" in FIG. 2 illustrating the cooperation between the actuating ring 10 and the treadmolding segments 16. The treadmolding segment 16 includes a sliding shoe 18 which extends around the guide mechanism 14. The sliding shoe 18 may be a separate piece, or may be embodied as one piece with the treadmolding segment 16, as shown in FIG. 3. A plurality of wear plates 20 are attached to conical inner surface 12, interposed between the actuating ring 10 and the treadmolding segment 16 to facilitate smooth movement of the treadmolding segment 16. The wear plates are comprised of a base layer 22 and a lubricating layer 24.

Figure 4:
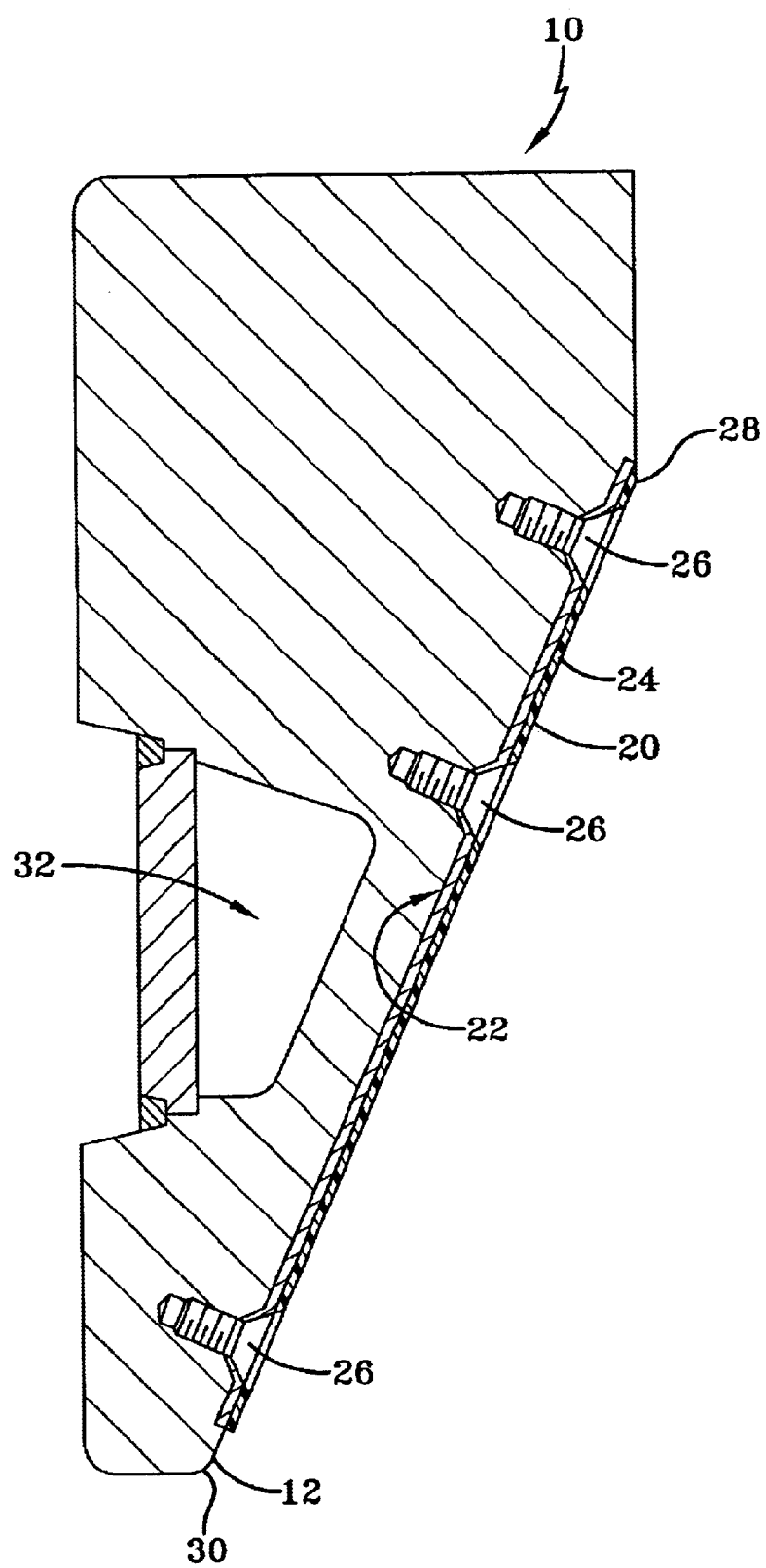
FIG. 4 is a cross-sectional view taken along the line 4—4 in FIG. 2.

A cross-sectional view of the actuating ring 10 taken along the line 4—4 in FIG. 2 is illustrated in FIG. 4, exemplifying the conical inner surface 12. The surface area of the conical inner surface 12 may be defined as a conical frustum wherein the base of the frustum is formed by the circumference of a lower edge 30 and a plane parallel to the base is formed by the circumference of an upper edge 28. A plurality of wear plates 20 are attached to the conical inner surface 12 by any conventional means, such as screws 26. The wear plates 20 are positioned such that the base layer 22 faces the conical inner surface 12 and the lubricating layer 24 faces the treadmolding segments (not shown). A steam chamber 32 is supplied with heat used for molding the tire.

Figure 5:
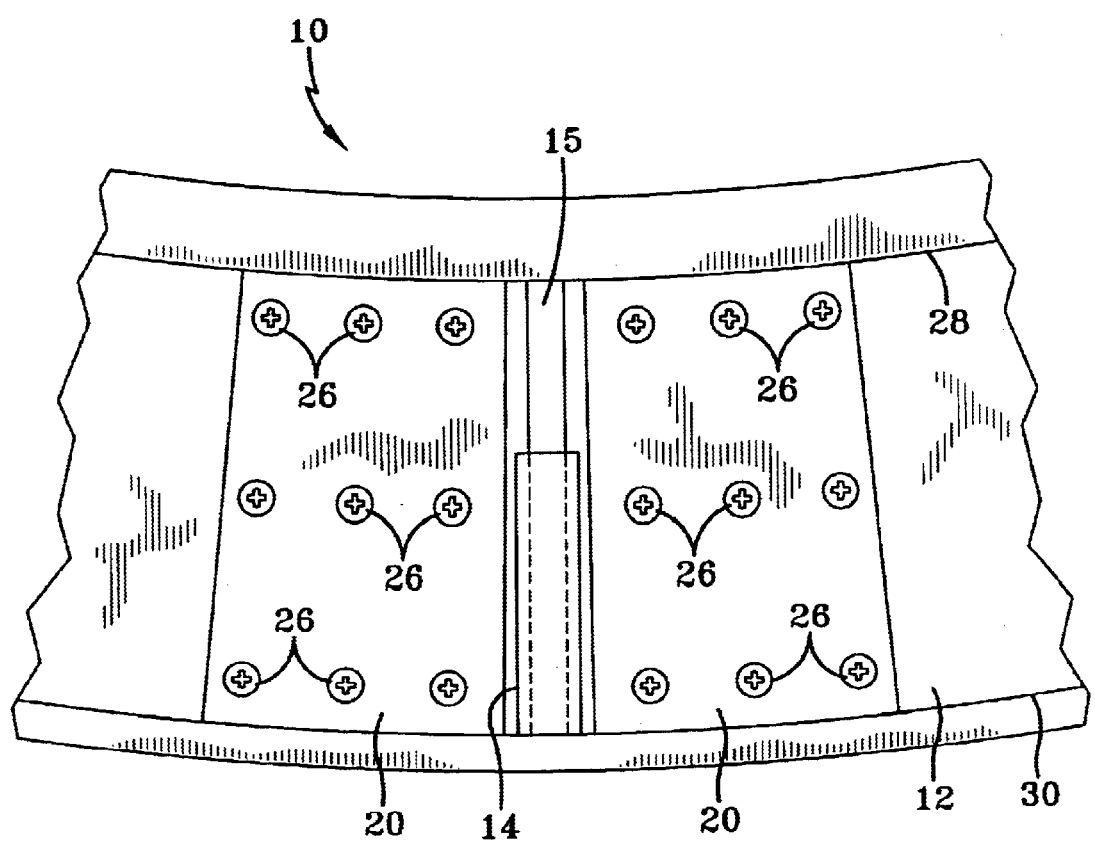
FIG. 5 is a view taken along the line 5—5 in FIG. 2 showing the wear plates mounted to the conical inner surface of an actuating ring according to a preferred embodiment of the present invention.

FIG. 5 shows a detail of the wear plates 20 mounted to the conical inner surface 12 of the actuating ring 10. The wear plates are secured with mounting screws 26. A plurality of guide mechanisms 14 are mounted to the actuating ring 10 for cooperation with "T"-slots 15 provided in the sliding shoes (not shown). The wear plates 20 are shaped to extend between the upper edge 28 and lower edge 30 of the conical inner surface 12. The wear plates 20 are also fashioned so as to minimize the gap between any adjacent wear plates. Further, the wear plates 20 are shaped to minimize the gap between the wear plates and the guide mechanisms 14.

Figure 6:
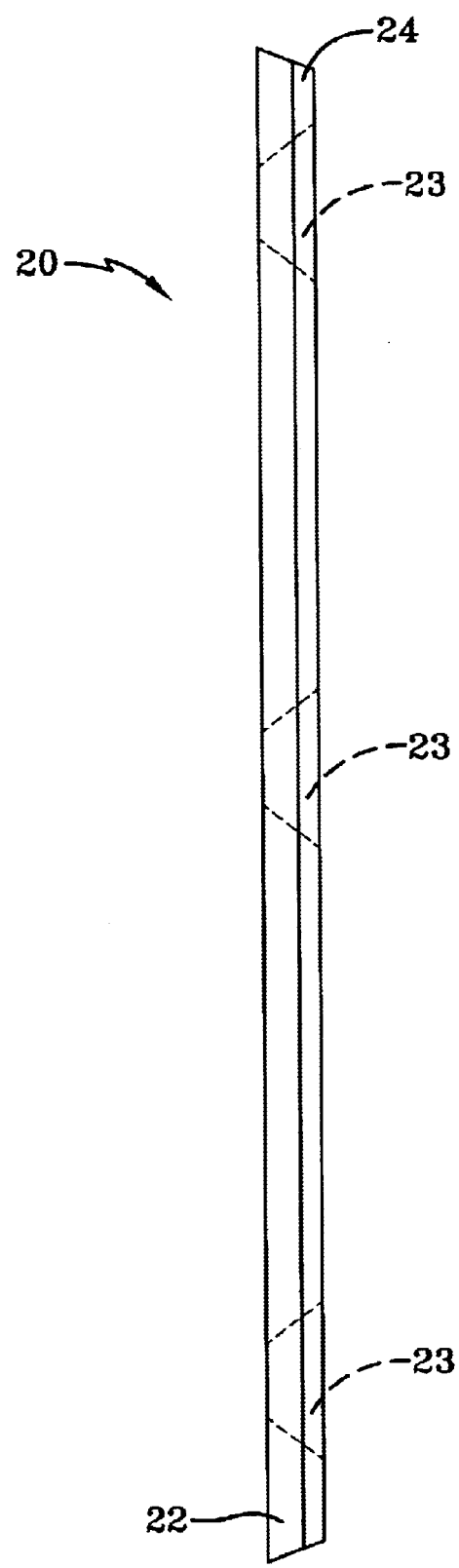
FIG. 6 is a side view of a wear plate according to a preferred embodiment of the present invention.

A side view of a wear plate 20 is shown in FIG. 6. The wear plate is preferably about 0.118 inches thick, preferably comprising a base layer 22 about 0.077 inches thick. The base layer is preferably fabricated from steel and provides support for the wear plate. A softer lubricating layer 24 is disposed upon the base layer 22. The lubricating layer 24 is preferably a bronze composition, such as bronze-graphite, preferably about 0.041 inches thick. The thicknesses of the wear plate 20, base layer 22, and lubricating layer 24 may be varied as desired to match the characteristics of a particular tire mold. The materials used for the base and lubricating layers 22,24 may also be varied as desired. For example, the base layer 22 may be fabricated from other suitable materials such as graphite-impregnated steel. Likewise, the lubricating layer 24 may be fabricated from copper-graphite compositions. Materials for layers 22,24 may be selected based on their thermal conductivity characteristics in addition to their characteristics as base and lubricating materials. The wear plate 20 is shaped so as to cover the surface area of the conical inner surface 12 to a maximum extent without interfering with the proper operation of the mold. In one example, the wear plates 20 cover at least 90% of the surface area of the conical inner surface 12 of the actuating ring 10. In one variation, the wear plates 20 cover at least 94% of the surface area of the conical inner surface 12 of the actuating ring 10. The resulting increased wear plate surface area increases the amount of surface area of the conical inner surface 12 that is in contact with the treadmolding segments 16 of the tire mold and reduces air gaps between the conical inner surface 12 and the treadmolding segments. A plurality of openings 23 may be added to the wear plate 20 to facilitate mounting the wear plate to the conical inner surface 12.

The invention is further illustrated with reference to the following example:

EXAMPLE

The performance of a tire mold utilizing wear plates according to an embodiment of the present invention, designated C1, is compared to a prior art wear plate, designated "control." The metrics are illustrated in Table 1.

TABLE 1

|  | Units | Control | C1 |
| --- | --- | --- | --- |
| Surface Area Coverage | % | 80 | 96 |
| Cure Time | % of Mold Cycle Time | 100% | ≦95% of Control |

While certain representative embodiments and details have been shown for the purpose of illustrating the invention, it will be apparent to those skilled in the art that various changes may be made therein without departing from the spirit or scope of the invention.

What is claimed is:

1. A tire mold, comprising:

upper and lower sidewall forming parts;

an actuating ring having a conical inner surface, the actuating ring encircling the upper and lower sidewall forming parts;

a plurality of wear plates located at the conical inner surface of the actuating ring, the wear plates being shaped to cover at least 90% of the surface area of the conical inner surface of the actuating ring;

sliding shoes having T-slots;

a plurality of guide mechanisms mounted to the actuating ring for cooperation with the T-slots; and a tread molding ring affixed to the sliding shoes, the tread molding ring being segmented such that the segments move radially inwardly when the actuating ring is lowered.

2. The tire mold of claim 1 wherein the wear plates further comprise:

a base layer;

a lubricating layer; and a plurality of mounting holes.

3. The tire mold of claim 2 wherein the base layer is graphite-impregnated steel.

4. The tire mold of claim 2 wherein the lubricating layer is a bronze-graphite composition.

5. The tire mold of claim 2 wherein the lubricating layer is a copper-graphite composition.

6. The tire mold of claim 2 wherein the lubricating layer is about 0.041 inches thick.

7. The tire mold of claim 2 wherein the base layer is about 0.077 inches thick.

8. The tire mold of claim 1 wherein the wear plates cover at least 94% of the surface area of the conical inner surface of the actuating ring.

9. The tire mold of claim 8, wherein the wear plates cover substantially 96% of the surface area of the conical inner surface of the actuating ring.

10. A tire mold, comprising:

upper and lower sidewall forming parts;

an actuating ring having a conical inner surface, the actuating ring encircling the upper and lower sidewall forming parts; and a plurality of wear plates located at the conical inner surface of the actuating ring, the wear plates being shaped to cover at least 90% of the surface area of the conical inner surface of the actuating ring; and a tread molding ring being segmented and disposed such that the segments move radially inwardly when the actuating ring is lowered.

11. The tire mold of claim 10 wherein the wear plates cover at least 94% of the surface area of the conical inner surface of the actuating ring.

12. The tire mold of claim 11, wherein the wear plates cover substantially 96% of the surface area of the conical inner surface of the actuating ring.

* * * * *